United States Patent [19]
Schyman et al.

[11] Patent Number: 5,539,732
[45] Date of Patent: Jul. 23, 1996

[54] SWITCHING EQUIPMENT ARRANGEMENT

[75] Inventors: Lars Schyman, Tumba; Anders Bjenne; Peter Dahlberg, both of Huddinge, all of Sweden

[73] Assignee: Telefonaktiebolaget L M Ericsson, Stockholm, Sweden

[21] Appl. No.: 213,694

[22] Filed: Mar. 16, 1994

[30] Foreign Application Priority Data

Mar. 18, 1993 [SE] Sweden .................. 9300895

[51] Int. Cl.$^6$ .................. H04J 3/02
[52] U.S. Cl. .................. 370/58.1; 370/58.2; 370/58.3; 370/68.1
[58] Field of Search .................. 370/58.1, 58.2, 370/58.3, 60, 60.1, 68.1, 110.1, 76, 110.4, 111; 379/219, 229, 230, 231

[56] References Cited

U.S. PATENT DOCUMENTS 4,955,019  9/1990  Mizuhara .................. 370/85.7

FOREIGN PATENT DOCUMENTS 085256  8/1983  European Pat. Off. .

*Primary Examiner*—Melvin Marcelo
*Assistant Examiner*—Huy D. Vu
*Attorney, Agent, or Firm*—Burns, Doane, Swecker & Mathis

[57] ABSTRACT

The invention relates to an arrangement adapted for use in switching equipment which is included in a telecommunications system, wherein the switching equipment includes, among other things, a number of incoming connections (4) that can be coupled via first coupling units (3); a number of outgoing connections (4a) that can be connected via second coupling units (3a);

wherein the switching equipment (2) cooperates with or includes requisite control means (11) and coupling means (10) for connecting an incoming connection (4) and/or a part-data flow occurring on such a connection with an indicated outgoing connection (4a), and/or data part-flow that can be transmitted on such a connection;

wherein a number of category allocating devices (31) belonging to respective connections and pre-configured normally by a processor associated with the control means (11) are adapted to allocate to each time slot belonging to the time-divided data flow a predetermined category membership such as a "control"-time slot, a CTS-signal or CTS-time slot, or a "data"-time slot, a DTS-signal or a DTS-time slot.

According to the invention the arrangement includes a a means (38) which functions to so influence the output signal (31a) from one or more of the category allocating means (31) that the means (38) will suppress the use of a number of normally available DTS-time slots and increase the number of available CTS-time slots.

It is proposed that FIG. 2 is published together with the Abstract.

9 Claims, 4 Drawing Sheets

SWITCHING EQUIPMENT ARRANGEMENT

TECHNICAL FIELD

The present invention relates to an arrangement adapted for use in switching equipment included in a telecommunications system.

The invention finds particular use in switching equipment of the kind in which a plurality of incoming connections are established by first coupling units;

a plurality of outgoing connections are connected by second coupling units;

said switching equipment cooperates with or includes requisite control means and coupling means for connecting an incoming connection and/or coupling a data part-flow occurring on such a connection with one or more pointed-out or indicated outgoing connections, and/or data part-flows that can be transmitted on such connections;

the pointing-out of an outgoing connection is initiated by signals occurring on the incoming connection;

the coupling of an incoming connection with an outgoing connection by said coupling means is effected, among other things, with the aid of information carrying control signals which are initiated and generated by the control means and which can be transmitted over links that are connected between units belonging to said switching equipment; the information content of said control signal and the exchange of information between said units takes place in the form of digital data flows;

the data flows contain, among other things, a user formatted information content (DTS-signals) in an encoded form and also switch-internal control signals (CTS-signals) in an encoded form, the content of said signals being intended to manoeuver and activate functions within the switch;

the digital data flows are divided time-wise;

a predetermined number of mutually sequential time slots or the like are coordinated to form a time frame or the like; and in which there is provided a number of category allocating means which are associated with respective connections and which are pre-configured by a processor normally associated with the control means and which are adapted to allocate to selected time slots associated with the time-divided data flow a predetermined category membership, such as a "control"-time slot (CTS-signal) or such as a "data"-time slot (DTS-signal), among others.

DESCRIPTION OF THE KNOWN PRIOR ART

Several different embodiments of switching equipment included in telecommunications systems are known to the art.

One example of the principle of a switching system which exhibits the aforesaid features and in which the present invention can be used to advantage, includes a plurality of terminating units to which incoming connections (Link to Switch) and outgoing connections (Switch to Link) are established.

In other switching cases, an incoming connection can constitute an outgoing connection and vice versa.

A number of terminating units are able to coact with one and the same multiplexing unit over internal links. A number of multiplexing units are structured to form a selector unit and function as a coupling device or a switch matrix.

It is also known to connect to one or more terminating units control means including a processor or processor unit, other links and/or connections associated with the control means.

In the case of switching equipment of this kind, it is necessary to utilize a number of devices which are associated with the internal links and which allocate a particular category to respective time slots, and to ensure that each of these devices will provide a predetermined category distribution of the categories allocated to the time slots which is adapted to normal operating conditions.

These devices, normally using memory stores, have in normal operating conditions a specific configuration which at least in the case of certain links selects more user formatted DTS-signals than the switch-internal CTS-signals, since the need to transmit user-formatted information content is greater than the need for control signals.

Thus, in normal operation, it is possible to select the ratio between DTS-signals or DTS-time slots and CTS-signals or CTS-time slots so as to lie beneath the value 100:1.

It is also known that when the entire switching equipment, or large parts thereof, needs/need to be configured (in startup routines) or to be reconfigured (in the case of temporary faults), it is necessary to transmit large quantities of switch-internal control information in the form of CTS-signals via links and between units.

Regarding the state of the art it must be mentioned the publication EP-A2-0 085 265, wherein is disclosed a digital time-division switch comprising a multiplexer, which multiplexes digitalized voice signals.

This embodiment uses subscriber circuits LCo, interoffice trunk circuits TKo, tone,trunk circuits TNT and a multiplexer MPX for multiplexing a plurality of input signals.

The multiplexer MPX is generating an number of sequentially oriented time frames, where one is shown in FIG. 2a, of EP-2A-0 085 265 and the time slots for each time frame are coordinated to carry signal units in the form of data.

Some time slots TSo - TSi are group related and carry control data (SCN), other group related time slots $TS_{i+1}$-$TS_j$ carry tone signal data (TONE) and still other group related time slots $TS_{j+1}$-$TS_n$ carry voice signal data (Voice).

The number of time slots within each group is fixed.

This system is based upon the pricipal that from each time frame shall be extracted a group of time slots.

Thus the circuit (D) shall extrakt control data time slot information, whereby the time frame has the configuration shown in FIG. 2c of EP-A2-0 085 265.

Thereafter the switching network (SW) shall extrakt the group of tone signal data (TONE), whereby the time frame has the configuration shown in FIG. 2d of EP-A2-0 085 265.

Processed data in the controll unit (PU) can via a circuit (I) add a new group (SD) into the time slots that previously were allocated for control data (SCN). (See FIG. 2a of EP-A2-0 085 265).

Referring to FIG. 6 it is shown how the time slots for voice signals have been increased with a group of additional time slots.

SUMMARY OF THE INVENTION

TECHNICAL PROBLEMS

When considering the known state of the art as described above, it will be seen that a technical problem resides in providing, with the aid of simple means, provisions which, when the need arises, enables a large number of time slots to be allocated another category membership corresponding to said need, for instance to enable the number of CTS-signals or CTS-time slots to be increased at the cost of a reduction in the available DTS-signals or DTS-time slots within each time frame.

It will also be seen that a technical problem resides in realizing the importance of being able to choose between allowing all DTS-signals to be inhibited and to transmit solely CTS-signals in their stead, or to permit a predetermined number of DTS-signals (and/or their distribution) to be inhibited within a number of time frames.

Another technical problem resides in realizing the importance of allowing this desired, instantaneous category change to be controlled by a control signal to which high priority has been assigned.

Another technical problem resides in realizing the importance of providing conditions which will enable pre-configured devices which belong to internal links and which are intended to allocate a predetermined category membership to the information within each selected time slot to be activated so that the number of CTS-time slots and DTS-time slots within one and the same time frame can be markedly changed instantaneously for an increasing number of available CTS-time slots at the cost of a corresponding reduction in the number of available DTS-time slots, so as to create conditions for rapid reconfiguration of the category membership of the signals.

In addition, a technical problem resides in realizing the advantages that are afforded by being able to use within selected time intervals each DTS-time slot within each time frame as a CTS-time slot.

Another technical problem resides in the ability to readily choose between completely blocking a link for user formatted information transmission during those time intervals in which solely switch-internal signalling information is required, or to choose to greatly restrict user formatted information transmission during those time intervals when only large quantities of switch-internal signalling information is required.

It will also be seen that a technical problem resides in realizing the time gains that can be achieved with such restructuring or reconfiguration with regard to the startup or restart of switching equipment when the content of the devices or memory stores concerned is uncertain or has been lost completely.

SOLUTION

The invention is intended to solve one or more of the aforesaid technical problems and to this end takes as its starting point an arrangement of the aforedescribed kind, wherein the arrangement is supplemented with means or devices which are constructed to so influence the effect of the output signal from one or more pre-configured allocating memories that said means will suppress or inhibit a number of available user-formatted DTS-time slots and increase the number of available switch-internal CTS-time slots with the intention of increasing the information content required to control the switch functions.

According to proposed embodiments which lie within the scope of the invention, the allocation of categories performed by said means can be changed in a controllable fashion.

The allocation of categories by said means is capable of being inhibited by the occurrence of a superordinate control signal which activates solely switch-internal CTS-time slots.

The following alternative coupling or switching cases are also proposed:
  a) Upon the occurrence of a control signal for changing the category allocation of the allocatable time slots,
     a1. all allocatable time slots intended for user-formatted information content can be replaced with allocatable time slots intended for switch-internal formatted information content, via a unit; and
     a2. only all allocatable time slots that are intended for user-formatted information content and that occur within a time-section that has earlier been pointed out are exchanged for allocatable time slots that are intended for switch-internal formatted information content, wherein a limited information transfer of user-formatted information content is maintained.

In the latter case, the exchange of time slots is effected with the aid of a time-steered control signal or with the aid of a fixed memory having predetermined division between the category allocation of the time slots.
  b) Upon the occurrence of a function-selecting control signal,
     b1. there is selected via a unit having a number of available functions one of said functions, such as to permit all allocatable time slots intended for user-formatted information content to be replaced with allocatable time slots intended for switch-internal formatted information content; and
     b2. there can be chosen via a unit having a number of available functions one of said functions, such as to permit solely all allocatable time slots intended for user-formatted information content and which occur within a time section that has earlier been pointed-out to be replaced with allocatable time slots intended for switch-internal formatted information content, wherein a limited transmission of user-formatted information content is maintained.

To this end, the output signal of said unit and the output signal of said allocating memory may be applied as input signals to a selector unit or modulator, wherein the output signal of the modulator is applied as an input signal to a selector unit which is adapted to select category membership for the selected time slots.

ADVANTAGES

Those advantages that are primarily afforded by an inventive arrangement reside in the creation of features which enable the number of available switch-internal CTS-time slots to be increased rapidly and instantaneously within a time frame at the cost of a corresponding reduction in the number of user-formatted DTS-time slots and therewith enable all of the functions of a switching equipment, or large parts of said functions to be configured rapidly and systematically, for instance when starting-up or reconfiguring when restarting.

BRIEF DESCRIPTION OF THE DRAWINGS

An embodiment of an inventive arrangement at present preferred will now be described in more detail with reference to the accompanying drawings, in which

FIG. 1 is a block schematic illustrating the principles of switching equipment that may advantageously be incorporated in a telecommunications system.

Figure 1:
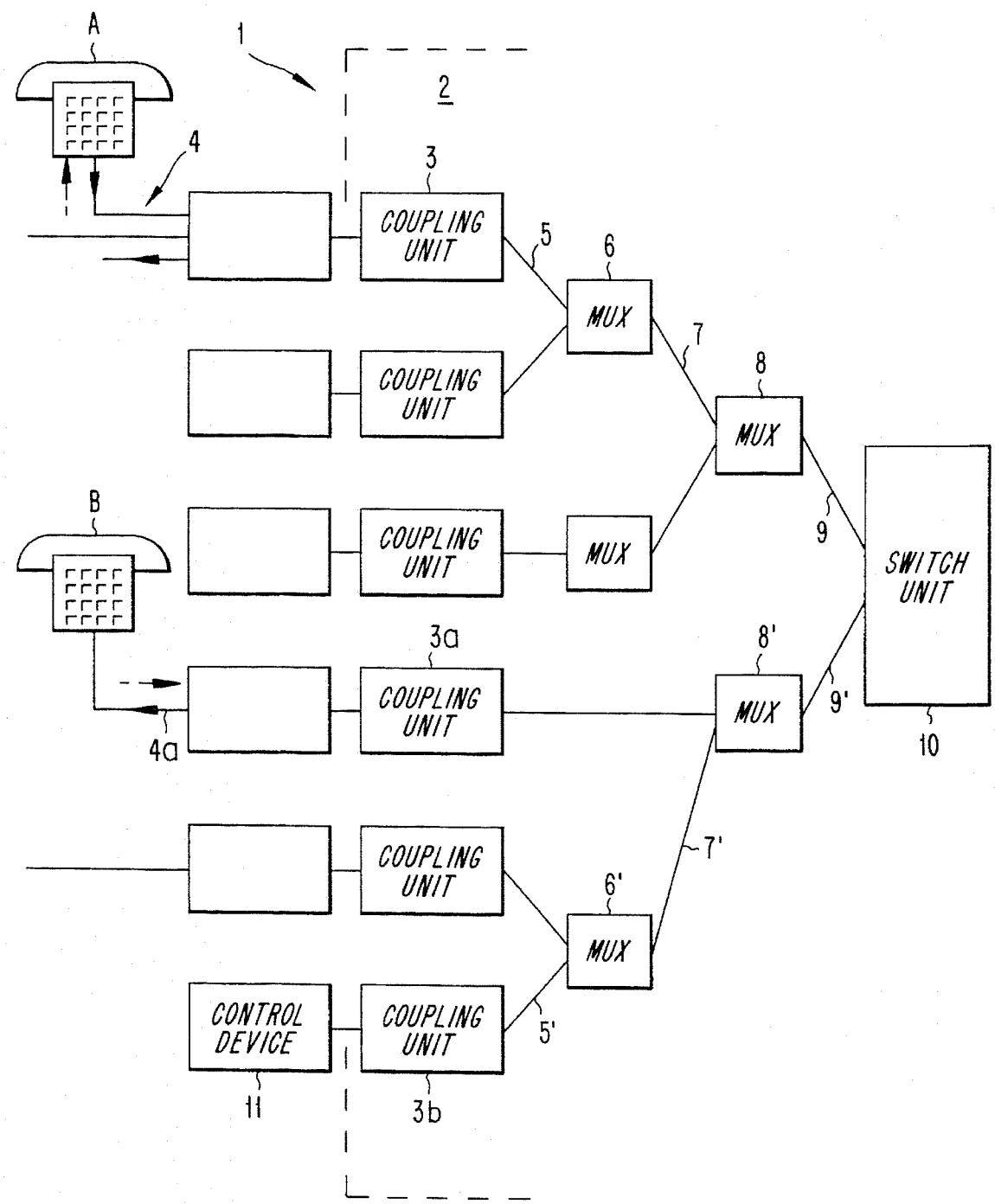
FIG. 1 is a block schematic of switching equipment included in a telecommunications system and in which the present invention finds particular application.

In the FIG. 1 illustration, the telecommunications system is referenced generally 1, while the switching equipment is referenced generally 2.

The switching equipment 2 includes a number of incoming connections 4 which are each connected by one of a number of available first coupling units or terminating units 3, and a number of outgoing connections 4a which are connected by one of a number of available second, corresponding coupling units or terminating units 3a.

It should be observed that one and the same coupling unit may function to couple an incoming connection and/or an outgoing connection.

The connections and links described here are normally adapted for two-way traffic, even though only a single information direction is described in the following description, for reasons of simplicity.

The coupling units, such as the units referenced 3, 3a and 3b, are comprised of terminating units (Swith Terminating Unit) and each of these units is connected to a "superordinate" unit 6 by (one or more) links.

These superordinate units are comprised of multiplexing units (Terminal Connecting Unit) and are connected together by further internal links.

In this description, we are content with illustrating that the unit 3 is connected to the unit 6 via a link 5, and that information is exchanged from the unit 3 to the unit 6. (Link to Switch).

However, the multiplexing unit 6 is also connected to a further multiplexing unit 8 by means of one or more links 7, and the multiplexing unit 8 is, in turn, connected to a switch unit 10 by means of one or more links 9, said unit 10 functioning as the switch core or matrix.

The terminating unit 3b of the FIG. 1 illustration is connected to a control device 11 which includes a processor unit and which is adapted for superordinate control of the functions in the switching equipment 2. Links 5', 7' and 9' and multiplexing units 6' and 8' can be used to this end.

It can be mentioned by way of example that when a subscriber A connected via the incoming connection 4 wishes to be placed in speech connection with a subscriber B, the control device 11 will evaluate the wishes of the A-subscriber via selected links and multiplexing units and also via the switching unit 10, and select in accordance therewith a free connection route through the switching core 10 and select appropriate links within the switching equipment to establish a speech connection between the subscriber A and the subscriber B, via the outgoing connection 4a.

In order to achieve this speech connection, it is necessary to transmit a number of switch-internal control signals having the requisite information content.

An established speech connection requires the transmission of user formatted information content, such as speech signals, and also to a lesser extent switch-internal control signals.

The requisite information content is transmitted by selected bit configurations occurring within mutually sequential time slots, where a number of time slots are coordinated to form a time frame.

Normally, time slots which occur within several time frames are required to transmit a selected complete information content.

In order to facilitate understanding of the illustrated signalling system, it can be mentioned that all time slots "TS" are allocated different group membership, so-called ATS-time slots and BTS-time slots.

Each time frame includes a number of BTS-time slots which are normally allocated specific positions in the time frame.

Each time frame normally contains a large number of ATS-time slots, which are also allocated specific positions in the time frame.

It can thus be mentioned that the so-called BTS-time slots carry information through the bit configuration chosen in the time slot, this bit configuration being required, among other things, to synchronize transmitted data flow in the form of bit configurations. Although these bit configurations can occur within each available time slot, it has been assumed in FIG. 4 for the sake of simplicity that a BTS-time slot occurs at the beginning a of each time frame.

The invention requires no detailed description of the number of BTS-time slots within a time frame nor a specific description of their specific positions or their functions.

On the other hand, the invention does require a more detailed description of the ATS-time slots and of the necessary selection and category allocation.

It is necessary to allocate each time slot among all ATS-time slots a category membership in order to structure the information content of transmitted bit configurations.

Two categories are of particular significance, however, in obtaining an understanding of the present invention, a first category, so-called CTS-signals or CTS-time slots, and a second category, so-called DTS-signals or DTS-time slots.

CTS-signals are concerned with switch-internal signals which occur within a time slot and which are intended to serve as signal information for the requisite control of switch associated functions.

DTS-signals are concerned with user formatted signals which occur within a time slot and which are intended to serve as signals for carrying requisite user-initiated information (such as speech signals) or information content.

The exchange of signals is thus effected with the aid of the digital data flows, wherein one part-data flow is included in one time slot. A number of such time slots are coordinated to form a time frame. Normally, a number of time frames are required to carry all of the signal information.

Figure 2:
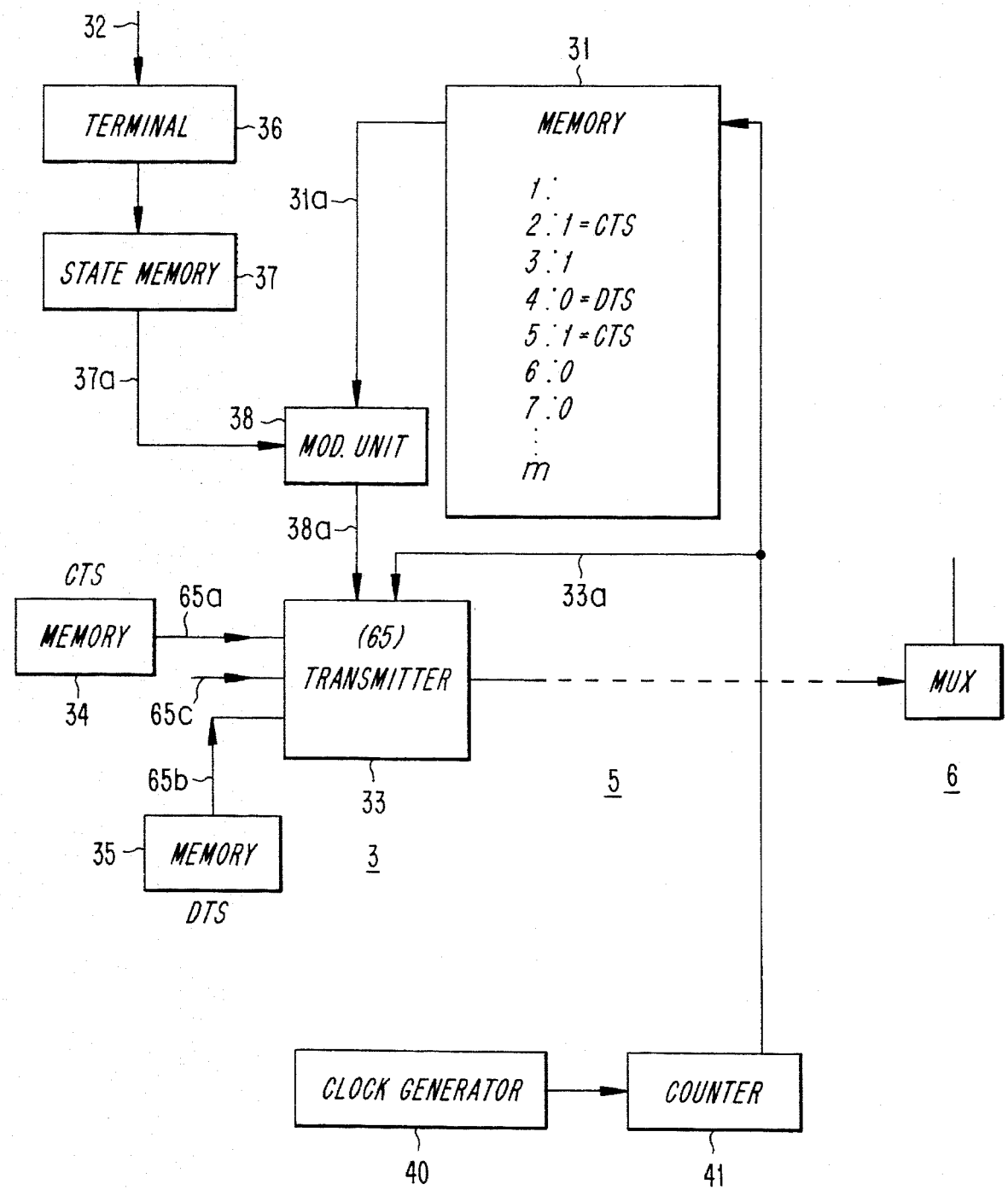
FIG. 2 is a block schematic of one among several available links for signal transmission in one direction within the switching equipment, including associated category allocating means where the present invention finds use.

Although the embodiment illustrated in FIG. 2 shows only one signal transmission direction, from the unit 3 to the unit 6, it will be understood that in the switching equipment illustrated in FIG. 1 it shall be possible to exchange information in both directions in all links and connections.

All signals to be sent from the unit 3 to the unit 6 are compiled of information content occurring in the form of sequentially allocated digital part-data flows or data flows and are coordinated in time slots.

As previously mentioned, these data flows are divided sequentially in time frames and in time slots. Each time slot, one or which is shown in FIG. 3, contains information in the form of a word which includes a predetermined number of bit positions, such as n number of bit positions.

Figure 3:
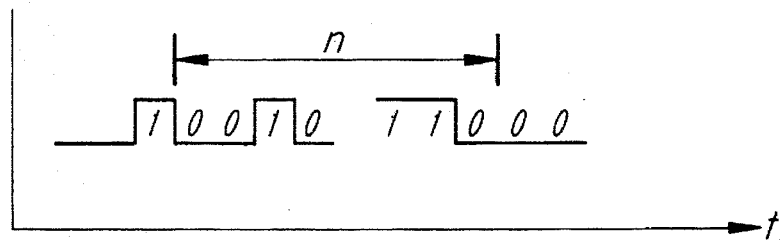
FIG. 3 illustrates an example of the structuring of a time slot.
Figure 4:
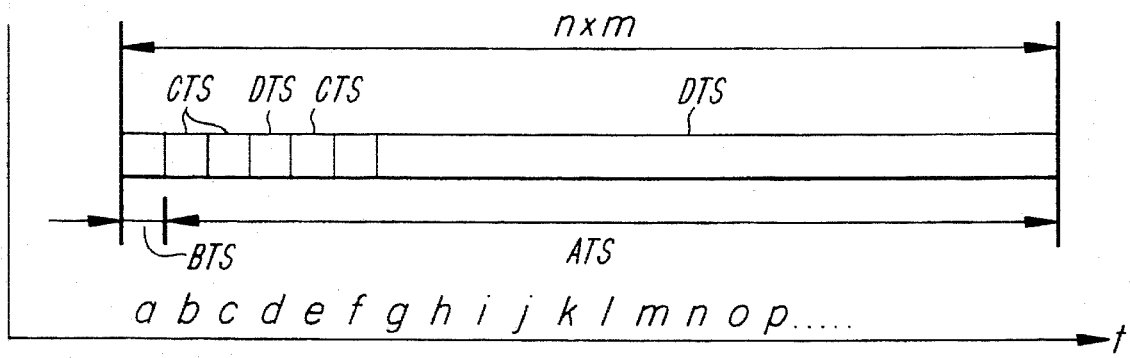
FIG. 4 illustrates an example of the structuring of a time frame constructed from a number of time slots.

FIG. 4 illustrates a complete time frame which is comprised of a predetermined number of the time slots illustrated in FIG. 3, for instance m number of time slots.

As illustrated in FIG. 4, each time frame begins with a predetermined number of time slots of specific group membership, a so-called BTS-signal or BTS-time slot, although in the case of the illustrated embodiment only one such time slot is shown for the sake of simplicity, this time slot being intended to create time-wise frame locking and to provide a reference time point for the remainder of the time slots in the time frame.

Following a BTS-time slot a in FIG. 4 is a large number of allocatable time slots (b–p . . .), all of which have a group membership and fall within the designation ATS-time slots. Each of these ATS-time slots is divided into different categories, either into a CTS-time slot or a DTS-time slot.

By "allocatable" time slots is meant time slots in which each time slot can be selectively allocated one among several available categories, in the present application a CTS-time slot or a DTS-time slot.

Each of the CTS-time slots carries a bit configuration which is at least partially representative of the control signals required to maintain and restructure the functions within the switching equipment.

A complete control signal will normally require an information content which requires the use of a number of CTS-time slots either within one and the same time frame or divided among a number of time frames.

Furthermore, a number of CTS-time slots may carry information which is intended to change a prevailing category division or to point-out categories in said means.

By this is meant that when starting-up or when the control unit 11 establishes the need to change the signal transmission pattern, to change the allocation, in the transmission from the unit 3 to the unit 6, a packet of CTS-signals or CTS-time slots is sent from the unit 6 to the unit 3 so as to restructure the connection—the unit 3 to the unit 6—for instance to send many more CTS-signals.

The invention includes means for this changed signal structure, as will be described in more detail herebelow.

The DTS-time slots carries a bit configuration which is user formatted and therewith significant to the information content, i.e. the actual communication content ( speech signals, telefax signals, data signals and so on).

By choosing one of two special binary combinations for given selected bit positions within each time slot, the receiver 6 is able to establish whether or not a received time slot shall be interpreted as containing CTS-signals or DTS-signals.

The invention does not include those means that are required in the receiver 6 to interpret and control the function within the switching equipment in response to the category membership of each time slot and its bit configuration, and consequently this part of the system will not be described in detail.

In normal operation of the switching equipment and when the signal transmission load on the link 5 is normal, each time frame need only contain a few (at times only one) CTS-time slots, and consequently a predominant part of the available allocatable time slots can be allocated the category DTS-time slots.

As will be understood, it is natural that in the normal operation of the switching equipment, the need for information content and exchange will greatly exceed the need of switch-internal control signals.

Thus, it is normal to allot to the allocating devices or memories a predetermined position for and distribution between CTS-time slots and DTS-time slots, this division or distribution being adapted directly to normal traffic conditions on the link.

Figure 5:
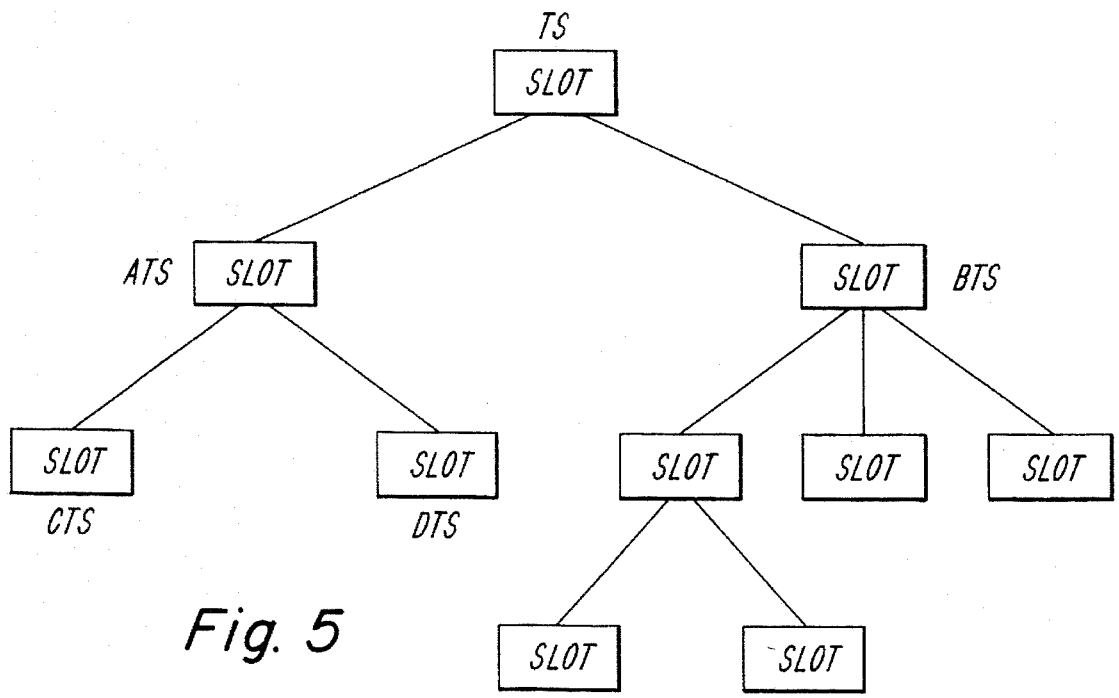
FIG. 5 illustrates schematically requisite selection between the group membership of the time slots and the subsequent category membership.

FIG. 5 shows that each transmitting unit 3 must include means for distributing occurrent time slots TS so as to sort-out these time slots either as an allocatable ATS-time slot or as a non-allocatable BTS-time slot, and also means which enables these time slots to be divided further in accordance with category membership.

However, the invention is based on the concept of evaluating each ATS-time slot to establish whether this time slot shall be allocated the category of a CTS-time slot or a DTS-time slot.

Referring back to FIG. 2, it will be seen that the unit 3 includes means, among other things in the form of a memory 31, which allocates a group and category to occurrent time slots, said means being pre-configured for normal traffic conditions in the manner shown. A first position "1" applies to non-allocatable BTS-time slots, and remaining positions "2-m" apply to allocatable ATS-time slots.

When a bit position in the memory 31 is a logic "1", the time slot in question shall be interpreted as a CTS-time slot, whereas when the bit position is a logic "0", the time slot shall be interpreted as a DTS-time slot.

The memory 31 is addressed from a time slot counter 41 which is counted-up by a clock pulse generator 40.

Thus, in position "2" a logic "1" will be delivered on the line 31a and in the absence of the invention (not 38) the signal is fed directly to a switch 65 in the transmitter 33.

The same also applies to position "3". In position "4", a logic "0" is delivered on the line 31a, and so on through all memory positions.

FIG. 2 also illustrates schematically that the distribution of categories, represented by the illustrated content of the memory 31, can be ignored under some conditions and in some time sections to the benefit of another temporary category distribution.

There is required to this end a signal modifying unit 38 which can be activated by a control signal on line 32.

The category distribution or division on a line 38a can be chosen through the signal modifying unit 38, either as the content of the memory 31 (normal mode) or with some other category distribution or division.

When the unit 6 sends a signal on a line (not shown) to a receiver (not shown) in the unit 3 requesting a changed or a selected category division, there occurs on line 32 a signal which functions as an input signal to a terminal 36, which receives requisite information which can be interpreted as activate "Packet mode" or inhibit "Packet mode" and therewith pass to normal mode.

Upon receipt of the signal on the line 32 to activate or inhibit "Packet mode" there is activated a state memory 37 which is connected to the signal modifying unit 38 by a line 37 and the nature of which will be described in more detail herebelow with reference to FIG. 6.

If the signal on the line 32 is of the nature which enables one available modifying pattern to be selected from a number of available modifying patterns, the system will include a terminal 36 which interprets the content of the signal, and a unit 37 which memorizes the signal content and the choice.

Activation which corresponds to a chosen modifying pattern is effected via the signal modifying unit 38 on line 38a.

These alternative possibilities will be described in more detail with reference to FIG. 6 and FIGS. 7A–7C.

In a normal mode, the content of the memory 31 will be interpreted such that with each ATS-time slot, the memory 31 is asked whether the time slot concerned shall contain CTS-information or DTS-information.

When a logic "1" is present in the momentary position of the memory 31 and a normal mode prevails, a logic "1" will occur on line 31a and pass the unit 38 unchanged through the unit 38 and thereafter occur on the line 38a. The signal is delivered to the transmitting unit 33 which then collects information stored in a memory 34 for CTS-time slots via the selector 65, and transfers the information or the bit configuration stored in the memory, via the transmitter 33 to the receiving unit 6, over the link 5 and within the time space of the time slot concerned.

When a logic "0" occurs in a position "4", interpretation is such that the selector 65 will collect information stored in a memory 35 for DTS-time slots and transmit the information or bit configuration stored in said memory to the unit 6, over the link 5 and within the time space of the time slot concerned.

Also shown in FIG. 2 is a line 33a over which the value of the counter 41 is transmitted, and each time-section within which an ATS-time slot shall occur can be decided in the unit 33.

Information is collected from the memory 34 over line 65a, while information is collected from the memory 35 over a line 65b.

Information other than CTS-information and DTS-information can be collected over a line 65c, although this facility is not concerned directly with the present invention.

When it is necessary to reconfigure the selector, for instance due to desired changes, voltage failure, overloading, uneven loads, or when starting-up switching equipment when the storage positions and category pointers of the allocating memories 31 are not known, or when there is doubt as to the content of the memories, there will be a sudden need for a large number of CTS-signals, whereas the number of DTS-signals required can be reduced or totally excluded.

The invention is based on the understanding that in a startup procedure or like procedure for the switching equipment 2 when normal operation no longer exists, it is possible to reconfigure the switching equipment very quickly by drastically reducing the number of DTS-time slots to the benefit of a corresponding increase in the number of CTS-time slots, so that the whole of the allocatable information content of the time frame, or substantially the whole of said allocatable information content, can be comprised of switch-internal control signals.

Figure 6:
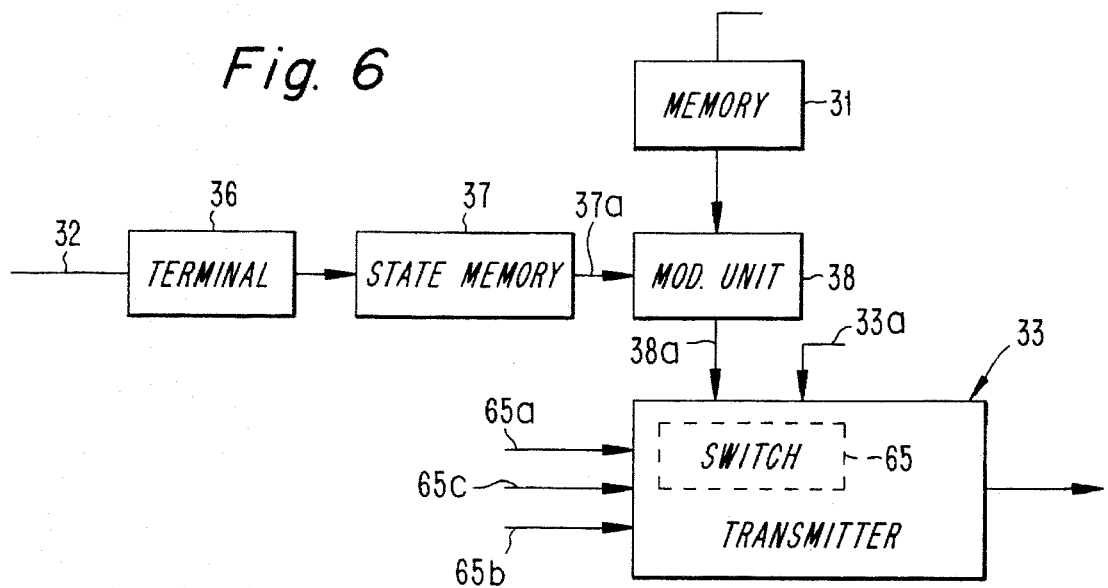
FIG. 6 is a block schematic of one embodiment in which a means has a specific configuration which can be inhibited to the advantage of a superordinate control signal.

To this end, the invention proposes the use of a terminal 36 which interprets incoming signals on line 32 and stores the information in a state memory 37, as illustrated in FIG. 6.

The state stored in the state memory 37 remains until a signal relating to another state is detected in the terminal 36, this new state being stored in the memory 37.

When the signal on line 32 is interpreted to mean that "Packet mode" shall be activated, it is proposed in accordance with one embodiment that all ATS-time slots within each time frame are allocated CTS-time slot information via a modifier 38.

Figure 7A:
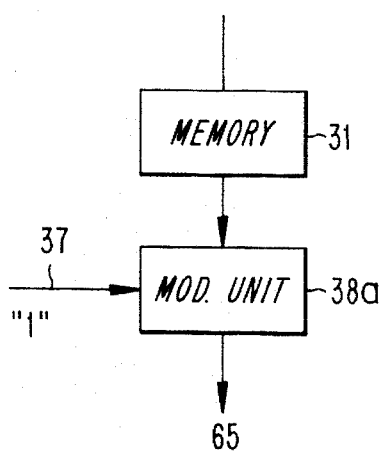
FIGS. 7A–7C illustrate examples of equipment which generate different degrees of inhibition.

As illustrated in FIG. 7A, this can be effected in a manner which constantly inhibits the output signals 31a from the memory 31 and to allocate CTS-information to each ATS-time slot, irrespective of the content of the memory 31.

Accordingly, the modifier 38 may have the form of an OR-gate 38a, where the output signal from the state memory 37 is constantly a logic "1" and irrespective of whether the memory 31 generates a logic "0" or a logic "1" for each time position, the selector unit 65 will obtain a logic "1" from the line 38a and therefore select CTS-signals or CTS-information for each time slot.

It also lies within the scope of the invention to include under "Packet mode" a given small message transmission with DTS-signals simultaneously with a large number of CTS-signals.

Figure 7B:
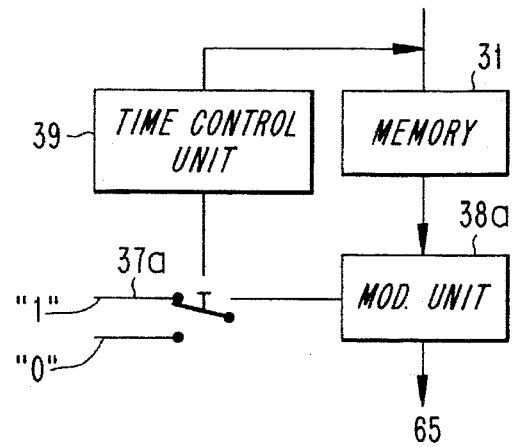

FIG. 7B illustrates an alternative embodiment which includes an OR-gate 38a similar to the FIG. 7A embodiment, but in which a time control circuit 39 activated by the time slot counter 41 is constructed to inhibit a logic "1" from the state memory 37 for given selected time slots and the content of the memory 31 for these time slots is given higher priority during these time sections.

An alternative embodiment (FIG. 7C) requires the signal on the line 32 to contain information concerning a specific choice of one memory configuration from among a number of available memory configurations.

Figure 7C:
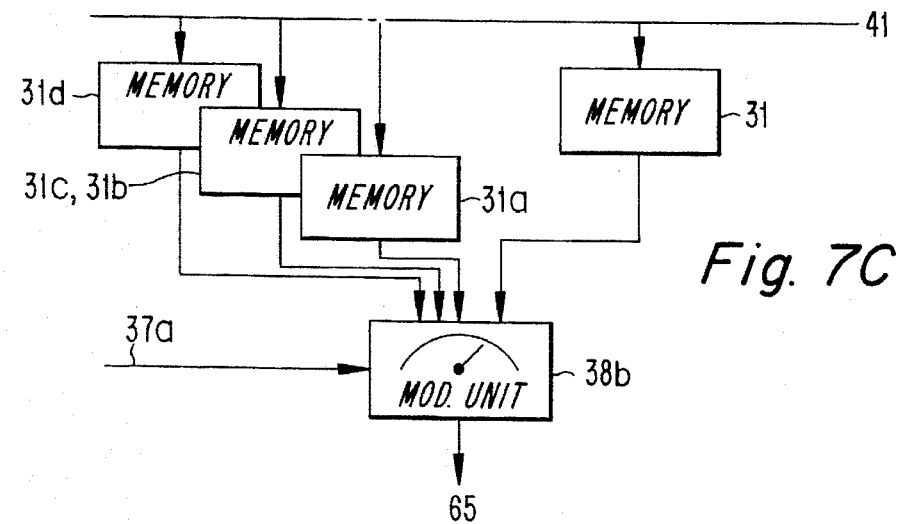

In the embodiment illustrated in FIG. 7C, there is used a modifier in the form of a selector 38b which is able to select in response to signals from the state memory 37 a category distribution represented by one memory selected from a number of available, preferably fixed or read-only memories 31a–31d, where the memory chosen has a category division and a configuration which differs from the distribution and configuration in the memory 31. Normally, the memories 31a–31d will activate, either completely or partially, CTS-time slots for all ATS-time slots.

In principle, the invention proposes that signal elements that are allocated a first category (CTS-time slots) shall increase in number at the cost of signal elements that are allocated a second category (DTS-time slots), and signal elements that are allocated a third category, and so on.

According to a number of embodiments, this increase may be chosen to include between 50% and 100%.

It will be understood that the invention is not restricted to the aforedescribed and illustrated exemplifying embodiments thereof and that modifications can be made within the scope of the following Claims.

We claim:

1. An apparatus for use in a switching equipment in a telecommunication system, wherein the switching equipment includes:

a plurality of first coupling units for coupling to the switching equipment incoming connections for carrying digital data signals, wherein the digital data signals are divided into time slots, and a predetermined number of mutually sequential time slots form a time frame;

a plurality of second coupling units for coupling to the switching equipment outgoing connections for carrying the digital data signals;

means for selectively coupling an incoming connection coupled to the switching equipment by a first coupling unit to a selected outgoing connection coupled to the switching equipment by a second coupling unit, wherein the outgoing connection is selected based on signals occurring on the incoming connection and on digital control signals;

control means for generating the digital control signals for the coupling means, wherein the digital control signals are transmitted via links between the first coupling units and the coupling means and are divided into time slots;

a plurality of category allocating devices, wherein the category allocating devices belong to respective incoming connections and outgoing connections and are adapted to allocate each time slot to a respective predetermined category and to generate category-indicating output signals, the categories including a category to which are allocated control time slots and a category to which are allocated data time slots, and the category allocating devices comprise memory means pre-configured for normal traffic conditions; and a processor which is associated with the control means and which configures the category allocating devices to allocate the time slots to the predetermined categories; and wherein the apparatus comprises means for modifying the category-indicating output signal of at least one of the category allocating devices to suppress the use of at least one data time slot and increase by at least one the number of control time slots, and the modifying means can ignore content of the memory means to the benefit of temporary category distribution.

2. The apparatus of claim 1, wherein the modifying means inhibits category allocations by the category allocating devices in response to a control signal for obtaining solely control time slots.

3. The apparatus of claim 1, wherein the switching equipment further includes a transmitter for selectively transferring time slots from at least one of the first coupling units to the coupling means, the transmitter including a selector responsive to the modifying means, and the modifying means includes a state memory.

4. The apparatus of claim 1, wherein the modifying means controllably changes category allocations by the category allocating devices.

5. The apparatus of claim 4, wherein the switching equipment further includes a transmitter for selectively transferring time slots from at least one of the first coupling units to the coupling means, the transmitter including a selector responsive to the modifying means, and the modifying means includes a state memory.

6. The apparatus of claim 1, further comprising a time control unit, wherein upon occurrence of a control signal for obtaining a change in a distribution of category allocations by the category allocating devices, the time control unit cooperates with the modifying means such that all allocatable data time slots which occur within a preselected time period are exchanged for allocatable control time slots.

7. The apparatus of claim 1, wherein the modifying means modifies category-indicating output signals according to one of a plurality of predetermined category allocation functions including a category allocation function whereby all allocatable data time slots occurring during a predetermined time period are exchanged for allocatable control time slots.

8. An apparatus for use in a switching equipment in a telecommunication system, wherein the switching equipment includes:

a plurality of first coupling units for coupling to the switching equipment incoming connections for carrying digital data signals, wherein the digital data signals are divided into time slots, and a predetermined number of mutually sequential time slots form a time frame:

a plurality of second coupling units for coupling to the switching equipment outgoing connections for carrying the digital data signals;

means for selectively coupling an incoming connection coupled to the switching equipment by a first coupling unit to a selected outgoing connection coupled to the switching equipment by a second coupling unit, wherein the outgoing connection is selected based on signals occurring on the incoming connection and on digital control signals;

control means for generating the digital control signals for the coupling means, wherein the digital control signals are transmitted via links between the first coupling units and the coupling means and are divided into time slots;

a plurality of category allocating devices, wherein the category allocating devices belong to respective incoming connections and outgoing connections and are adapted to allocate each time slot to a respective predetermined category and to generate category-indicating output signals, the categories including a category to which are allocated control time slots and a category to which are allocated data time slots; and a processor which is associated with the control means and which configures the category allocating devices to allocate the time slots to the predetermined categories; and wherein the apparatus comprises means for modifying the category-indicating output signal of at least one of the category allocating devices to suppress the use of at least one data time slot and increase by at least one the number of control time slots, wherein the modifying means modifies category-indicating output signals according to one of a plurality of predetermined category allocation functions that is selected in response to a control signal.

9. The apparatus of claim 8, wherein the modifying means modifies category-indicating output signals according to one of a plurality of predetermined category allocation functions including a category allocation function whereby all allocatable data time slots occurring during a predetermined time period are exchanged for allocatable control time slots.

* * * * *